(12) United States Patent
Rijsman (10) Patent No.: US 7,978,602 B2
(45) Date of Patent: Jul. 12, 2011

(54) DYNAMIC CONSTRUCTION OF LABEL SWITCHING PROTOCOL INTERFACES

(75) Inventor: Bruno Rijsman, Arlington, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1330 days.

(21) Appl. No.: 11/273,010

(22) Filed: Nov. 14, 2005

(65) Prior Publication Data

US 2008/0069110 A1    Mar. 20, 2008

(51) Int. Cl.
*H04L 12/28* (2006.01)

(52) U.S. Cl. ........ 370/230; 370/255; 370/356; 370/465; 709/238

(58) Field of Classification Search ............... 370/395.5, 370/352, 465; 709/238
See application file for complete search history.

(56) References Cited

U.S. PATENT DOCUMENTS

| | | | |
|---|---|---|---|
| 2002/0099849 A1* | 7/2002 | Alfieri et al. | 709/243 |
| 2003/0117954 A1 | 6/2003 | De Neve et al. | |
| 2004/0199604 A1* | 10/2004 | Dobbins et al. | 709/217 |
| 2004/0215817 A1 | 10/2004 | Qing et al. | |
| 2005/0198247 A1* | 9/2005 | Perry et al. | 709/223 |
| 2008/0069110 A1* | 3/2008 | Rijsman | 370/395.5 |

FOREIGN PATENT DOCUMENTS

EP    1 418 730    5/2004

OTHER PUBLICATIONS

Communication dated Apr. 29, 2008 for corresponding European Application No. 06 255 805.1, 5 pgs.
Peter Heywood, "MPLS Bigwigs Get Edgy," www.lightreading.com, Feb. 17, 2005, 2 pgs.
Notification of the First Office Action dated Jul. 3, 2009 for corresponding Chinese Application No. 200610145723.6, 5 pgs.
Notification of the Second Office Action dated Nov. 19, 2010, for corresponding Chinese Application No. 200610145723.6, 5 pgs.

* cited by examiner

*Primary Examiner* — Jianye Wu
(74) *Attorney, Agent, or Firm* — Shumaker & Sieffert, P.A.

(57) ABSTRACT

Techniques are described for dynamically constructing a label switching protocol interface in a network device. For example, the techniques allow dynamic construction of a Multi-Protocol Label Switching (MPLS) interface. According to some embodiments, upon receiving a network communication from a subscriber, a network device determines whether the subscriber requires support for the label switching protocol. If the subscriber requires such support, the network device creates an interface stack for the subscriber that includes an interface for the label switching protocol. In this way, the network device may route packets from the subscriber across a network of computing devices that use the label switching protocol, and forward packets from such a network to the subscriber. The subscriber and the network device need not communicate according to the label switching protocol and, in example embodiments, instead communicate according to a layer 2 communication protocol.

37 Claims, 4 Drawing Sheets

| MPLS |
| 59 |

| VLAN |
| 55 |

| ETHERNET |
| 53 |

FIG. 3A

| MPLS |
| 68 |

| PPP |
| 66 |

| ATM |
| 64 |

| SONET |
| 62 |

DYNAMIC CONSTRUCTION OF LABEL SWITCHING PROTOCOL INTERFACES

TECHNICAL FIELD

The invention relates to computer networks and, more particularly, to interface configuration on computer networks.

BACKGROUND

Individuals and enterprises communicate via computer networks. Because computer networks are expensive to establish and maintain, individuals and enterprises often form contracts with network service providers (NSPs). In exchange for some consideration, a NSP agrees to provide access to a computer network. After forming such an agreement, the individual or enterprise may use the computer network to communicate. In the context of a NSP agreement, the individual or enterprise may be referred to as a subscriber.

Using a computer network for communication may have one or more disadvantages. For instance, congestion on the network may substantially hinder communication between locations. In addition, malicious users on the network may intercept communications flowing between locations.

To address these disadvantages, a NSP may offer quality of service (QoS) guarantees to subscribers. For example, a NSP may reduce the likelihood of congestion delays by routing communications from the subscriber along a low-congestion path through the network that the NSP has specified in advance. The process of specifying a path for a type network communication is known as traffic engineering. Additionally, to enhance security, the NSP may provide a virtual private network (VPN) to the subscriber. In this case, the NSP may encrypt network communications and route the network communications only through trusted intermediate network devices. NSPs may use various communication protocols on the computer network to provide QoS guarantees and/or VPNs. For example, NSPs may use a label switching protocol, such as the Multi-Protocol Label Switching (MPLS) protocol or the Generalized Multiprotocol Label Switching (GMPLS) protocol, to provide engineered and/or secure label switched paths (LSPs) through the network.

SUMMARY

In general, principles of this invention are directed to techniques for dynamically constructing software interface stacks on a network device. More specifically, the techniques allow a network service provider (NSP) to dynamically construct a software interface stack for a particular subscriber that includes a label switching protocol interface. By dynamically constructing such a software interface stack for a subscriber, the NSP provides the subscriber with support for communication via the label switching protocol.

Some label switching protocol related services that an NSP may provide to a subscriber may require the NSP to provide a software interface stack for the subscriber that includes a label-switching protocol interface. As examples, an NSP may have to provide such an interface in order to allow a subscriber to access a layer 2 VPN (L2VPN) or a Virtual Private LAN service (VPLS). Further, in order for a subscriber and an NSP to exchange packets according to a label switching protocol, as opposed to the Internet Protocol (IP) or IPv6, the NSP typically must provide a subscriber software interface stack that includes an interface for the label switching protocol. A subscriber and NSP may communicate according to a label switching protocol instead of IP for a variety of reasons, including carrier's carrier applications, inter-domain VPN applications, inter-domain traffic engineering applications, inter-domain fast re-route applications, or for regulatory compliance. By dynamically constructing such a software interface stack for a subscriber, the NSP may provides the subscriber such label switching protocol related services.

Software interface stacks for a subscriber may be maintained by a network device used by the NSP to provide the subscriber with access to a network. Conventional software interface stacks are generally static, and their maintenance therefore consumes memory and processing resources of the network access device whether or not the interface is currently being used by the subscriber. By dynamically constructing a software interface stack that includes a label switching protocol interface for a subscriber according to the invention, a network device may avoid maintaining state associated with a software interface stack for the subscriber when the stack is not required by the subscriber, e.g., when the subscriber is not communicating via an LSP, or not online.

According to some embodiments, upon receiving a network request from the subscriber, a router or other network access device provided by an NSP determines that a subscriber requires communication according to a label switching protocol, e.g., to facilitate access to a L2VPN service provided by the NSP. In response to the determination, the router creates a software interface stack for the subscriber that includes an interface for label switching protocol, e.g., MPLS. When receiving subsequent packets from the subscriber, the router may use the label switching protocol interface to encapsulate the packets within label switching protocol packets, e.g., MPLS packets.

In one embodiment, the invention is directed to a method that comprises receiving a network communication from a subscriber and determining, when the network communication is received, whether the subscriber requires a label switching protocol interface. The method further comprises constructing an interface stack for the subscriber that includes the label switching protocol interface based on the determination.

In another embodiment, the invention is directed to a computer-readable medium containing instructions. The instructions cause a programmable processor to receive a network communication from a subscriber and to determine, when the network communication is received, whether a subscriber requires a label switching protocol interface. The instructions further cause the processor to construct an interface stack for the subscriber that includes the label switching protocol interface based on the determination.

In another embodiment, the invention is directed to a network device. The network device comprises a network interface card that receives a network communication from a subscriber, a control unit that determines, when the network communication is received, whether a subscriber requires a label switching protocol interface, and controls construction of a software interface stack that includes the label switching protocol interface based on the determination.

In another embodiment, the invention is directed to a method comprising receiving a network communication from a subscriber with a network card of a network device, sending an authentication request to a remote authentication service in response to the network communication, receiving a subscriber profile from the authentication service in response to the request, the subscriber profile indicating that the subscriber requires a label switching protocol interface, and constructing a software interface stack that includes the label switching protocol interface for the subscriber on the network card according to the subscriber profile.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
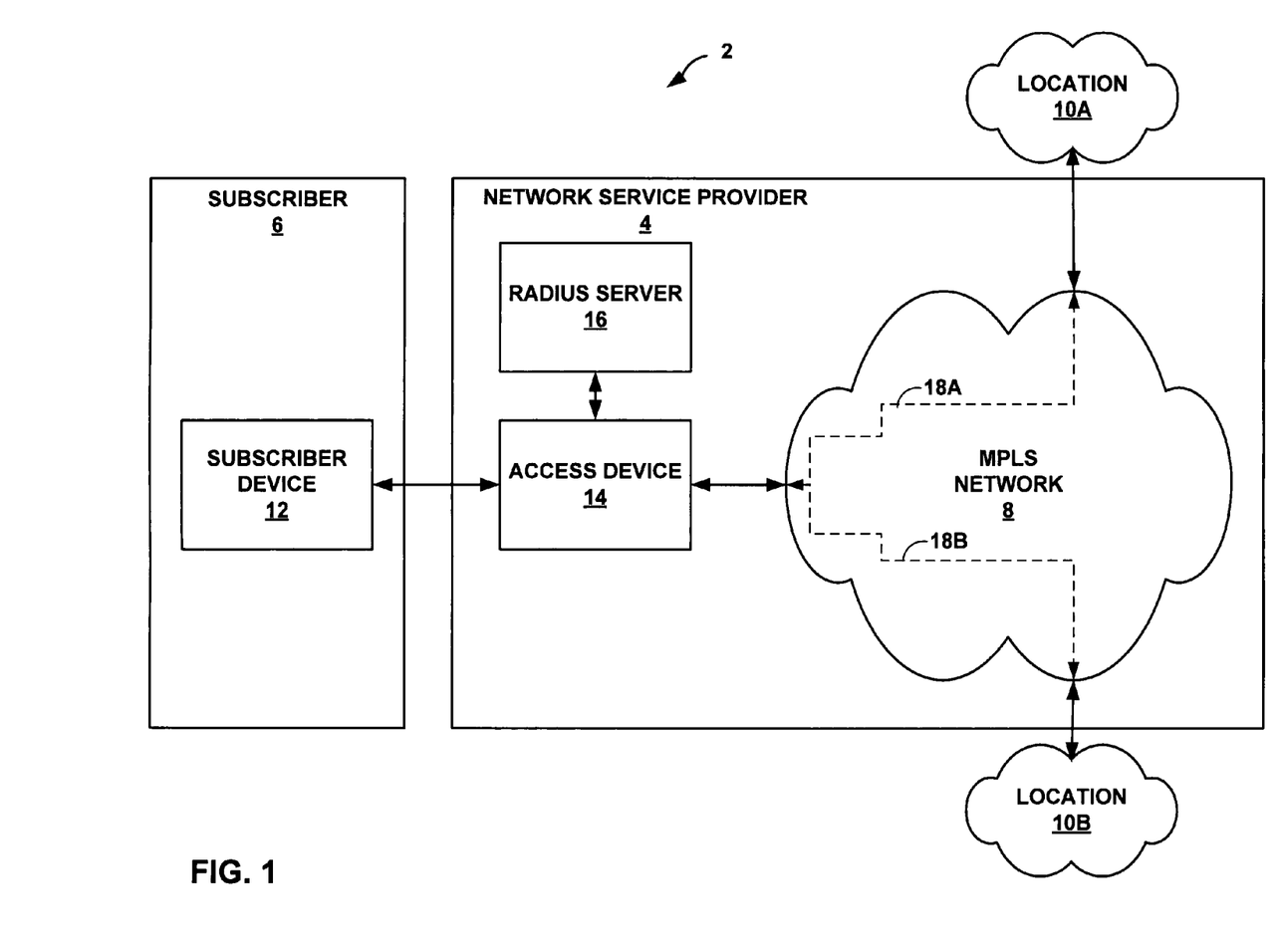
FIG. 1 is a block diagram illustrating an example system in which a network service provider provides a subscriber with access to a label switching protocol network.

FIG. 1 is a block diagram illustrating an example system 2 in which a network service provider (NSP) 4 provides a subscriber 6 with access to a label switching protocol network. In the illustrated example, the label switching network is a Multi-Protocol Label Switching (MPLS) network 8. However, the invention is not limited to embodiments in which an NSP provides access to an MPLS network. In some embodiments, the NSPs may provide access to other types of label switched networks, such as Generalized Multi-Protocol Label Switching (GMPLS) networks.

MPLS network 8 may be any MPLS-compatible computer network. An MPLS-compatible computer network is any network that includes a plurality of network devices, such as routers, that are compatible with the MPLS protocol. Network 8 may contain a variety of networked resources including routers, hubs, gateways, servers, workstations, network printers, faxes, network telephones, and the like. Network 8 may be located on a larger network, such as the Internet, or may be the Internet.

As shown in FIG. 1, network 8 may include, or be connected to, a first location 10A and a second location 10B (collectively, "locations 10"). Locations 10 may represent remote networks that subscriber 6 is able to communicate with via network 8. For example, subscriber locations 10 may be remotely-located offices of a larger entity, e.g., corporation, of which subscriber may be a part. NSP 4 may provide subscriber 6 with access to MPLS network 8 to, for example, provide traffic engineered and/or virtual private network (VPN) connectivity between the subscriber and the locations. In some embodiments, NSP 4 may provide subscriber 6 with access to MPLS network 8 to provide layer 2 VPN (L2VPN) or Virtual Private LAN between the subscriber and the locations. Subscriber 6 may be an individual, or an entity comprising a plurality of individuals.

To communicate with subscriber locations 10, subscriber 6 uses a subscriber device 12. Subscriber device 12 may be a personal computer, a cable modem, a wireless access point, a router, or another kind of network device capable of providing network connectivity for one or more computing devices. When subscriber 6 needs to initiate communication with one or both of locations 10, e.g., needs VPN connectivity, subscriber device 12 generates a network communication. Subscriber device 12 then sends the network communication to NSP 4. For example, subscriber device 12 could send a communication in a dynamic host configuration protocol (DHCP) discover message or request. As other examples, the subscriber device could send a communication via a point-to-point protocol (PPP), asynchronous transfer mode (ATM), Ethernet protocol, frame relay protocol, token ring protocol, Wireless-Fidelity protocol, or fiber channel protocol.

An access device 14 in NSP 4 receives network communications from subscriber 6. Access device 14 may be any network device that NSP 4 maintains to allow one or more subscribers 6 to access network 8. As examples, access device 14 may be a router at the edge of the provider network, e.g., a provider edge router at the edge of network 8, or a broadband remote access server (BRAS). When access device 14 receives the network communication, access device 14 determines whether subscriber 6 requires an MPLS interface. Based on the determination, access device 14 may construct a software interface stack for the subscriber that includes the MPLS interface.

For example, when access device 14 receives a network communication from subscriber 6, access device 14 may check whether a software interface stack exists for subscriber 6. If a software interface stack does not exist for subscriber 6, access device 14 may attempt to authenticate the subscriber. For example, access device 14 may request that subscriber 6 provide an authentication credential. This authentication credential may be a username and a password, a biometric, a one-time password, a unique token, or other information and artifacts that identify subscriber 6. In response to the request, access device 14 may receive the authentication credential from subscriber 6.

In other embodiments, the initial network communication received from subscriber 6 may include a request for connectivity and the authentication credential. In such embodiments, access device 14 may not need to determine whether the software interface stack exists, or request the authentication credential. In either case, access device 14 may provide the authentication credential to an authentication service. For example, access device 14 may provide the authentication credential to a Remote Access Dial-In User Service (RADIUS) server 16. Alternatively, access device 14 may authenticate subscriber 6 locally based on the authentication credential, send the authentication credential to a DIAMETER server (not shown), or use another authentication regime.

If RADIUS server 16 successfully authenticates subscriber 6, access device 14 determines whether subscriber 6 requires an MPLS interface. In particular, access device 14 may determine whether a subscriber profile associated with subscriber 6 specifies that subscriber 6 requires the MPLS interface. NSP 4 may configure the content of the subscriber profile to reflect terms of a service agreement between NSP 4 and subscriber 6. Thus, the subscriber profile may specify, as an example, that subscriber 6 requires a L2VPN service or VPLS and, therefore, requires an MPLS interface. In some embodiments, authentication of subscriber 6 may not be required. In such embodiments, access device may access the subscriber profile without first authenticating subscriber 6.

Access device 14 may access the subscriber profile through a variety of means. For example, access device 14 may cache the subscriber profile locally. Alternately, access device 14 may retrieve the subscriber profile from a remote data store. For example, in some embodiments, the data store may be maintained by RADIUS server 16. In such embodiments, when RADIUS server 16 successfully authenticates subscriber 6, RADIUS server 16 returns the subscriber profile. In this case, access device 14 and RADIUS server 16 may communicate in a modified version of the RADIUS protocol that includes attributes that specify which protocol interfaces a subscriber requires. As discussed above, the invention is not limited to embodiments in which an authentication server is a RADIUS server.

After using the subscriber profile to determine which interfaces subscriber 6 requires, access device 14 constructs a software interface stack for subscriber 6 that includes the interfaces. If the subscriber profile indicates that subscriber 6 requires an MPLS interface, or an interface for another label switching protocol, access device 14 constructs the interface stack to include an MPLS interface, or an interface for the other label switching protocol.

The subscriber profile may indicate whether the subscriber requires an MPLS "shim" interface, or an MPLS "major" interface. As used herein, the term "major interface" is used to refer to an interface that supports communication on both the subscriber and network sides of the interface according to a label-switching protocol. As used herein, the term "minor interface" is used to refer to an interface that supports communication on the network side of the interface according to a label-switching protocol, and supports communication on the subscriber side of the interface according to another, non-label-switching protocol. Accordingly, if subscriber device 12 is able to support MPLS communication, i.e., can communicate with access device 14 according to the MPLS protocol, the subscriber profile may indicate that subscriber 6 requires a MPLS "major" interface. On the other hand, if subscriber device 12 is not able to support MPLS communication, the subscriber profile may indicate that subscriber 6 requires a MPLS "shim" interface.

If the interface stack includes an MPLS "shim" interface, access device 14 may receive non-MPLS packets from subscriber 6. Non-MPLS packets may be PPP, ATM, Ethernet, frame relay protocol, token ring protocol, Wireless-Fidelity protocol, or fiber channel protocol packets or frames. Access device 14 may then use the MPLS interface to create MPLS packets that encapsulate the non-MPLS packets sent by subscriber 6. The MPLS packets include an MPLS header that contains label stack entries. Each label stack entry contains a label that instructs an intermediate network device how to forward the MPLS packet. For example, the MPLS header may cause the MPLS packet to follow a specific path 18A through MPLS network 8 to location 10A.

In addition, access device 14 may receive an MPLS packet from network 8, e.g., from location 10A. Access device 14 may then use the MPLS interface to create a non-MPLS packet by removing the MPLS header from the MPLS packet. In this way, an MPLS "shim" interface may cause access device 14 to act as an endpoint of a virtual tunnel through network 8. The virtual tunnel may be a bandwidth guaranteed path, L2VPN tunnel, or the like.

In addition, if the interface stack includes an MPLS "major" interface, access device 14 may receive an MPLS packet from subscriber 6. Access device 14 may then use the MPLS interface to send the MPLS packet to network 8. Similarly, access device 14 may receive an MPLS packet addressed to subscriber 6 from network 8. Access device 14 may then use the MPLS interface to send the MPLS packet to subscriber 6. Such an MPLS "major" interface may be useful, as examples, for carrier's carrier applications of service provider 4, inter-domain VPN applications, inter-domain traffic engineering applications, inter-domain fast re-route applications, regulatory compliance, and other purposes.

Dynamic construction of interface stacks for subscribers may present one or more advantages. For example, access device 14 allows NSP 4 to easily administer QoS agreements for many subscribers. In order to add, delete, or modify a QoS guarantee for a subscriber, NSP 4 only needs to modify a subscriber profile associated with the subscriber. Further, NSP 4 may use access device 14 to easily provide VPN services, such as L2VPN services, or VPLS to some customers. Moreover, NSP 4 may apply the principles of this invention with existing broadband remote access service infrastructure. Additionally, as discussed above, dynamic construction of interface stacks may allow access device 14 to avoid maintaining state for subscriber 6 when the interface stack is not needed, as would be occur in the case of a static interface stack.

Figure 2:
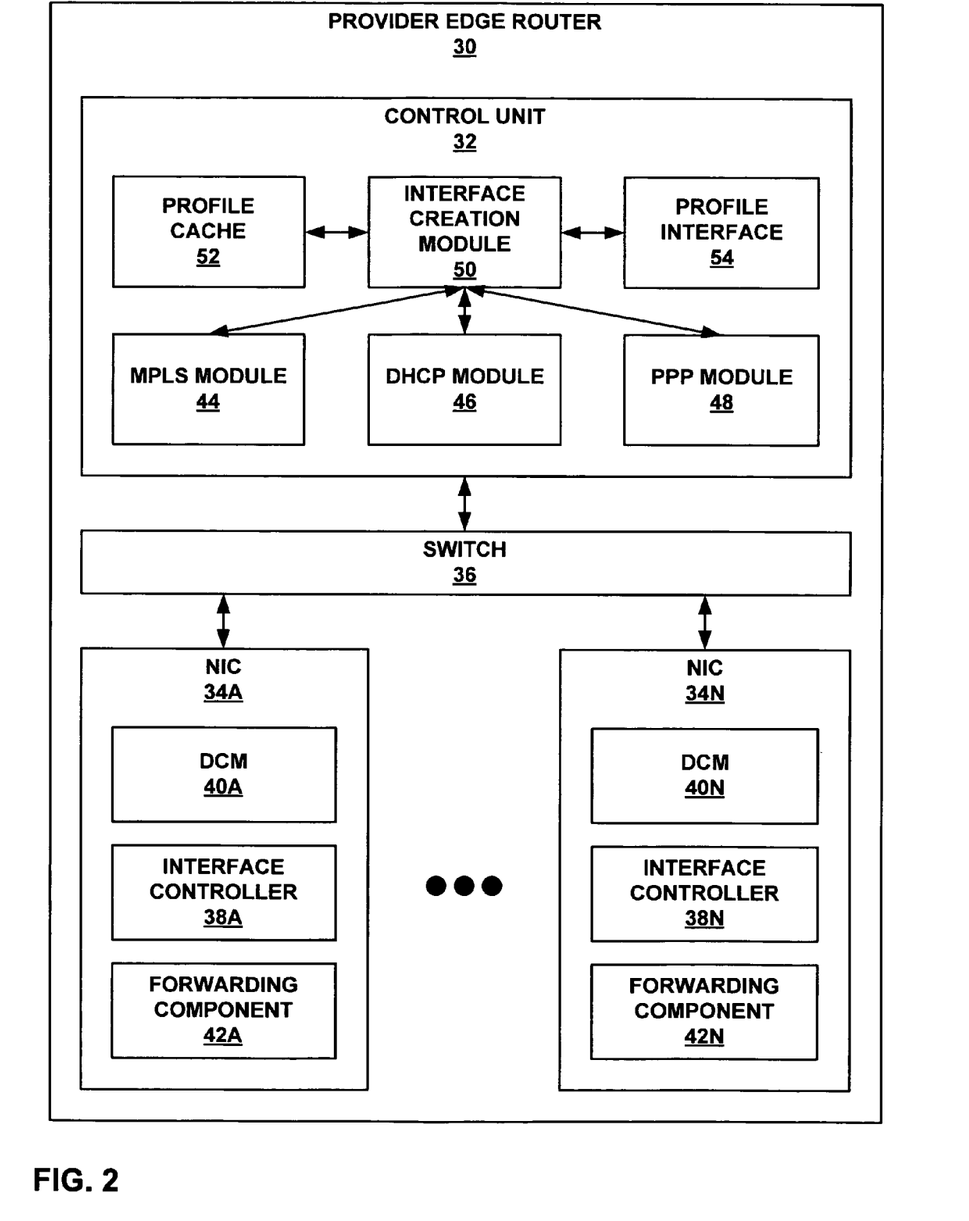
FIG. 2 is a block diagram illustrating an example network access device.

FIG. 2 is a block diagram illustrating an example embodiment of a network access device 14. In the illustrated example, the network access device takes the form of a provider edge router (PER) 30. PER 30 includes a plurality of network interface cards (NICs) 34A through 34N (collectively, "NICs 34"). In general NICs 34 forward packets to and from subscribers. One of NICs 34 also receives a network communication from subscriber 6, which may cause PER to dynamically construct an MPLS interface for the subscriber in the manner discussed above.

In addition, PER 30 comprises a control unit 32 that determines, when the network communication is received, whether subscriber 6 requires an MPLS interface. In this embodiment, an interface stack for subscriber 6 that includes the MPLS interface is constructed on one of NICs 34 based on the determination. In addition, PER 30 contains a high-speed switch 36. Switch 36 allows communication among NICs 34 and between NICs 34 and control unit 32.

As illustrated in FIG. 2, control unit 32 comprises at least one protocol-specific translation module that extracts information from the network communication that identifies subscriber 6. The protocol-specific modules of control unit 32 may include an MPLS module 44, a DHCP module 46, and a PPP module 48. In addition, control unit 32 includes an interface creation module 50 that creates an interface stack for subscriber 6 based on a subscriber profile of subscriber 6. Control unit 32 may also comprise a profile interface 54 through which interface creation module 50 retrieves the subscriber profile. In addition, control unit 32 may include a subscriber profile cache 52 that caches the subscriber profile locally.

As discussed above, NICs 34 receive network communications from subscribers of NSP 4. For example, NIC 34A may receive a network communication from subscriber 6. Each of NICs 34 includes a forwarding component (FC) 42 that receives a network communication from a subscriber. In addition, each of NICs 34 includes interface controllers 38 that determine whether a dynamic interface stack for subscriber 6 exists on NICs 34. Further, each of NICs 34 contains a dynamic configuration manager (DCM) 40 that constructs interface stacks on NICs 34.

When NIC 34A receives a network communication from subscriber 6, FC 42A asks interface controller 38A to process the network communication with an interface stack associated with subscriber 6. If NSP 4 has not authenticated subscriber 6, NIC 34A does not contain an interface stack for subscriber 6. In this case, interface controller 38A sends a request to DCM 40A to create an interface stack for subscriber 6. When DCM 40A receives the request, DCM 40A forwards the network communication from subscriber 6 to control unit 32 via switch 36.

Upon receiving the network communication forwarded by DCM 40A, control unit 32 determines whether subscriber 6 requires an MPLS interface. In particular, a protocol-specific module in control unit 32 extracts information from the network communication. For example, if the network communication is a DHCP request, DHCP module 46 may extract a media access control (MAC) address from the network communication. The protocol-specific module then forwards this information to interface creation module 50.

When interface creation module 50 receives information from a protocol-specific module, interface creation module 50 may initiate an authentication sequence. For example, interface creation module 50 may send instructions through NIC 34A requesting that subscriber 6 supply one or more authentication credentials. NIC 34A may then receive the authentications credentials from subscriber 6 and forward the authentication credentials to interface creation module 50. In other embodiments, as discussed above, the initial network communication from subscriber 6 may include the authentication credentials. In either case, interface creation module 50 may send the authentication credentials to RADIUS server 16, or other authentication server, via profile interface 54. Further, in some embodiments, as discussed above, interface creation module 50 or another component of PER 30 may authenticate the subscriber locally, e.g., based on information stored within profile cache. Additionally, in some embodiments, authentication of a subscriber is not required prior to retrieval of a subscriber profile, or generation of interface stack, as described above.

In some embodiments, after receiving authentication information from subscriber 6, interface creation module 50 determines whether a subscriber profile exists in profile cache 52 for subscriber 6. If profile cache 52 does not contain a profile for subscriber 6, interface creation module 50 sends a profile request to profile interface 54. Profile interface 54 may then transmit the profile request to a data store. For instance, profile interface 54 may send the profile request to RADIUS server 16. In some embodiments, the profile request may be the authentication credentials. In such embodiments, if RADIUS server 16 accepts the authentication credentials, RADIUS server 16 may send a subscriber profile to profile interface 54. In either case, upon receipt of the subscriber profile from the data store, profile interface 54 copies the subscriber profile into profile cache 52.

After receiving a subscriber profile from either profile cache 52 or profile interface 54, interface creation module 50 uses the subscriber profile to determine which interfaces the subscriber requires. For example, if the subscriber profile specifies that subscriber 6 requires that NSP 4 provide VPN service, then interface creation module 50 may determine that the subscriber requires an MPLS interface. Further, the subscriber profile may include additional configuration information about each interface. For instance, the subscriber profile may specify that NSP 4 must allocate a specific amount of bandwidth to an interface used by subscriber 6 when transmitting information through an MPLS L2VPN. Once interface creation module 50 has determined which interfaces subscriber 6 requires, interface creation module 50 sends interface construction instructions regarding these interfaces to DCM 40A on NIC 34A.

DCM 40A processes the interface construction instructions from interface creation module 50 and constructs an interface stack for subscriber 6 on NIC 34A. In particular, DCM 40A configures lower layer interfaces to use a particular interface as the next higher interface and higher layer interface to use a particular interface as the next lower interface. For example, NIC 34A may communicate with subscriber 6 via the Ethernet protocol. If DCM 40A receives interface construction instructions that command DCM 40A to construct a MPLS "shim" interface and a virtual local area network (VLAN) interface for subscriber 6, DCM 40 configures the Ethernet interface to use the VLAN interface as the next-highest interface. Next, DCM 40 configures the VLAN interface to use the MPLS interface as the next-highest interface. In addition, DCM 40A configures the MPLS interface to use the VLAN interface as the next lower interface, and the VLAN interface to use the Ethernet interface as the next lower interface.

After DCM 40A constructs the interface stack for subscriber 6, NIC 34A may receive and process packets from subscriber 6. For example, FC 42A may receive an Ethernet frame, from subscriber 6. FC 42A then requests that interface controller 38A use an interface stack associated with the source of the Ethernet frame, i.e., subscriber 6, to process the content of the Ethernet frame. As in the above example, interface controller 38A may process the Ethernet frame through an Ethernet interface, a VLAN interface, and an MPLS interface. After processing the frame with these interfaces FC 42A has an MPLS packet that encapsulates a VLAN packet that encapsulates an Ethernet frame. FC 42A may then forward this MPLS packet to the correct destination via MPLS network 8, e.g., to location 10A via path 18A. The various protocols identified in the preceding example are merely examples. Access devices according to the invention may construct protocol stacks to including an interface for a label switching protocol, and any other protocols necessary or desired to facilitate communication between a subscriber and other devices over a label switching network.

Figure 3A:
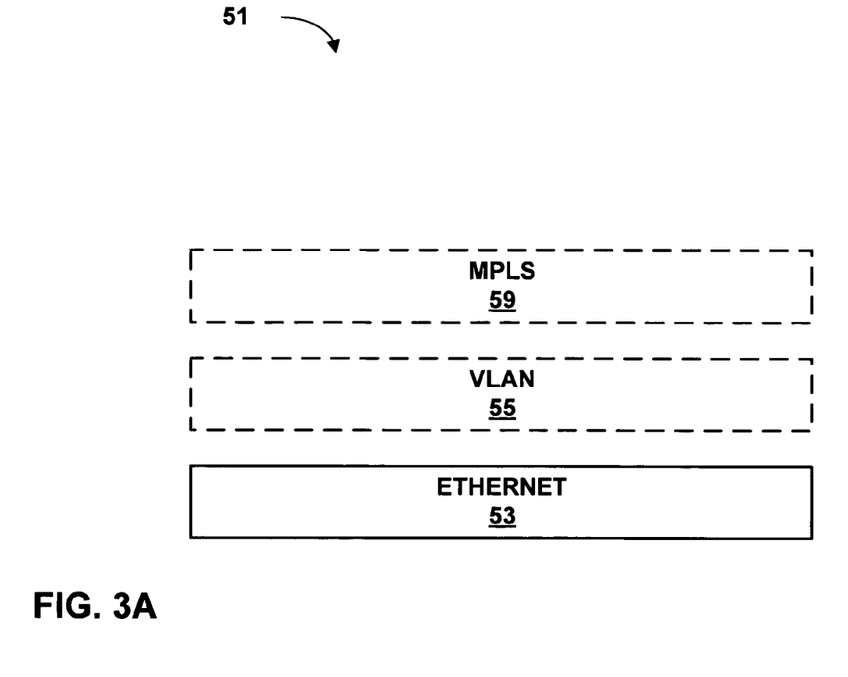
FIG. 3A is a block diagram illustrating an example embodiment of a software interface stack for a subscriber that includes an MPLS interface.

FIG. 3A is a block diagram illustrating an example embodiment of an interface stack 51 for a subscriber that includes an MPLS "shim" interface. Interface stack 51 may operate substantially similar to an interface stack used by PER 30 of FIG. 2 as described by way of example above. In the example embodiment of FIG. 3A, subscriber interface stack 51 includes an Ethernet interface 53, a VLAN interface 55, and an MPLS interface 59. This combination of interfaces may be useful in providing a VPLS to a subscriber.

When Ethernet interface 53 receives an Ethernet frame from subscriber 6, Ethernet interface 53 passes the frame to VLAN interface 55. VLAN interface 55 causes access device 14 to emulate an Ethernet network across another network. That is, VLAN interface 55 makes each subscriber device participating in a VLAN appear to each other subscriber device to be attached to the same Ethernet network, regardless of whether a subscriber device is actually attached to the same Ethernet network. In particular, VLAN interface 55 creates a VPLS packet by attaching a virtual circuit ID (VCID) to the Ethernet frame. The VCID uniquely identifies a VLAN associated with a subscriber. After creating the VPLS packet, VLAN interface 55 passes the VPLS packet to MPLS "shim" interface 59.

When MPLS "shim" interface 59 receives a VPLS packet from VLAN interface 55, MPLS "shim" interface 59 creates an MPLS packet by affixing one or more labels to the VPLS packet. The labels instruct devices in MPLS network 8 how to forward the MPLS packet. After MPLS "shim" interface 59 creates the MPLS packet, PER 30 may forward the MPLS packet to MPLS network 8. In this way, subscriber interface stack 51 allows PER 30 to use MPLS even though subscriber 4 did not originally send an MPLS packet.

When PER 30 receives an MPLS packet from MPLS network 8 via a core interface stack, the core interface pack passes the MPLS packet to subscriber interface stack 51, where MPLS and VLAN interfaces 59 and 55 remove the MPLS labels from the MPLS packet and the VCID from the VPLS packet. Ethernet interface 53 then processes the resulting Ethernet frame if necessary, and sends the Ethernet frame onto subscriber 6 via an Ethernet network.

Figure 3B:
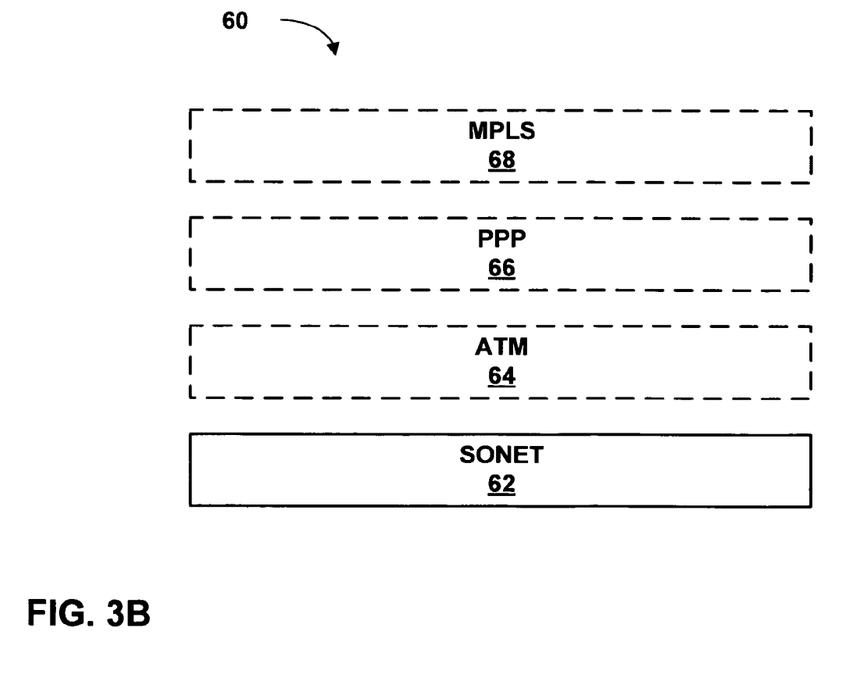
FIG. 3B is a block diagram illustrating another example embodiment of a software interface stack for a subscriber that includes an MPLS interface.

FIG. 3B is a block diagram illustrating an example embodiment of an interface stack 60 for a subscriber that includes an MPLS "major" interface. Interface stack 60 includes a SONET interface 62, an asynchronous transfer mode (ATM) interface 64, a point-to-point protocol (PPP) interface 66, and an MPLS "major" interface 68. These interfaces may be particularly useful for carrier's-carrier applications.

When PER 30 receives a SONET communication from subscriber 4, PER 30 applies SONET interface 62 of subscriber interface stack 60. SONET interface 62 converts the SONET communication into an ATM cell. ATM interface 64 may then extract a PPP frame from the ATM cell. If the protocol field of the PPP frame indicates that the PPP frame encapsulates an MPLS packet, PPP interface 66 decapsulates the PPP frame and passes a resulting MPLS packet to MPLS interface 68. After receiving the MPLS packet, MPLS interface 68 interprets labels of the MPLS packet to determine how to forward the MPLS packet across MPLS network 8. In this way, MPLS "major" interface 68 in subscriber network stack 60 allows subscriber 4 to transport MPLS packets generated by subscriber 4 through MPLS network 8. When PER 30 receives an MPLS packet from MPLS network 8 via a core interface stack, the core interface pack passes the MPLS packet to subscriber interface 60, where PPP and ATM interfaces 66 and 64 encapsulate the MPLS packet, and forward the resulting ATM cell onto subscriber 6 via a SONET link.

Figure 4:
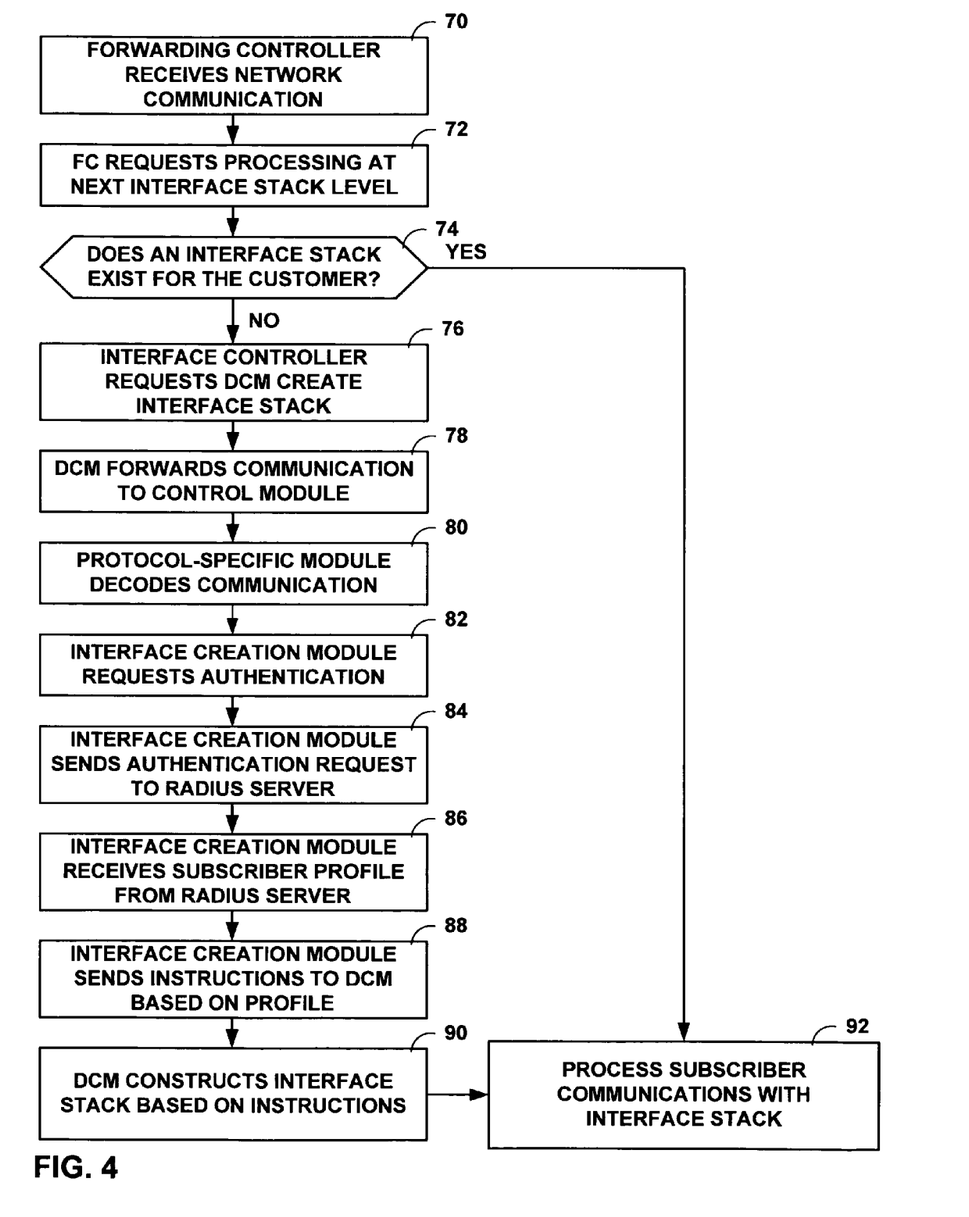
FIG. 4 is a flowchart illustrating an example method for dynamically constructing a software interface stack that includes a label switching protocol interface consistent with the principles of this invention.

FIG. 4 is a flowchart illustrating an example method for dynamically constructing a MPLS interface consistent with the principles of this invention. Although the method may be implemented on architectures different than that illustrated in FIG. 2, for purposes of illustration the flowchart of FIG. 4 is described in reference to FIG. 2.

Initially, FC 42A receives a network communication from subscriber 6 (70). In response, FC 42A asks interface controller 38A to process the network communication using a subscriber interface stack associated with subscriber 6 (72). If NIC 34A contains a subscriber interface stack associated with subscriber 6 (74), interface controller 38A processes the network communication with the subscriber interface stack (92). On the other hand, if NIC 34A does not contain the subscriber interface stack (74), interface controller 38A requests that DCM 40A construct the subscriber interface stack for subscriber 6 (76). To construct the subscriber interface stack, DCM 40A forwards the network communication from subscriber 6 to control unit 32 (78).

When control unit 32 receives the network communication from DCM 40A, a protocol-specific module in control unit 32 decodes the communication (80). For example, if the network communication is formatted in the PPP protocol, PPP module 48 decodes the network communication. In particular, the protocol-specific module extracts information about the network communication. For example, the extracted information may indicate that client 6 is requesting access to the Internet. After the protocol-specific module decodes the communication, the protocol-specific module forwards the information to interface creation module 50.

Interface creation module 50 may then request one or more authentication credentials from the subscriber (82). In particular, interface creation module 50 may use one of the protocol-specific modules to generate a network communication that demands that the subscriber present a username and password. For example, interface creation module 50 may use PPP module 48 to create a PPP communication that encodes such a demand for authentication credentials. Interface creation module 50 could then send the PPP communication to subscriber 6 via switch 36 and NIC 34A.

When interface creation module 50 receives the requested authentication credentials from subscriber 6, interface creation module 50 uses profile interface 54 to send an authentication request containing the authentication credential to RADIUS server 16 (84). Provided that RADIUS server 16 successfully validates the authentication credentials provided by subscriber 6, interface creation module 50 receives a subscriber profile associated with subscriber 6 from RADIUS server 16 (86). In other embodiments, as described above, an initial network communication from subscriber 6 may include the authentication credential. Further, in some embodiments, authentication of a subscriber is not required prior to dynamically construct a subscriber interface stack for the subscriber. Additionally, a subscriber profile may be stored locally, or stored remotely in data stores other than a RADIUS server.

Interface creation module 50 uses the subscriber profile to send interface construction instructions to DCM 40A (88). The interface construction instructions inform DCM 40A which interfaces subscriber 6 requires. Upon receiving the interface construction instructions from interface creation module 50, DCM 40A constructs a subscriber interface stack for subscriber 6 based on the instructions (90). In some embodiments, DCM 40A may construct a subscriber interface stack by configuring existing interfaces to interact with various other interfaces for a subscriber. For example, DCM 40A may configure a PPP interface to interact with an MPLS interface for subscriber 6.

After DCM 40A constructs the subscriber interface stack for subscriber 6, interface controller 38A may use the subscriber interface stack to process subsequent network communications for subscriber 6 (92). For instance, if subscriber 6 requires MPLS VPN service, interface controller 38A may use an MPLS interface in the subscriber interface stack to encapsulate an outbound network communication from subscriber 6 in MPLS packets and decapsulate MPLS packets received from MPLS network 8.

Various embodiments of the invention have been described. For example, FIG. 2 describes the invention in terms of a router. Further, the above specification associates certain functionality with specific modules or devices. Nevertheless, the invention is not limited to these embodiments. For example, in FIG. 2, interface controllers 40 and forwarding controllers 42 may be located in other components of PER 30 (e.g., control unit 32) and not located in NICs 34. Further, the invention may be embodied in network devices other than routers, such as servers or switches. In addition, the invention applies to label switching protocols other than the MPLS protocol. For instance, the invention may be used with other protocols such as RSVP or GMPLS to provide services to a subscriber. As used herein, the term "packet" is not limited to IP packets, and may refer to any of a packet, frame, cell, or the like. These and other embodiments are within the scope of the following claims.

The invention claimed is:

1. A method comprising:
receiving, with a network access device, a network access request from a subscriber device associated with a subscriber,
determining, with the network access device, when the network access request is received, whether the subscriber device requires a label switching protocol interface for encapsulating and decapsulating traffic associated with the subscriber device according to the label switching protocol for communication with a label switching network;

in response to receiving the network access request and upon determining that the subscriber device requires the label switching protocol interface, dynamically constructing a software interface stack on the network access device that includes a plurality of interfaces, each of the interfaces associated with a respective one of a plurality of protocols, wherein the plurality of interfaces includes the label switching protocol interface; and subsequent to dynamically constructing the software interface stack on the network access device, processing network communications from the subscriber device with the software interface stack of the network access device and routing the network communications from the network access device to the label switching network.

2. The method of claim 1, wherein the label switching protocol is a Multi-Protocol Label Switching (MPLS) protocol.

3. The method of claim 1, wherein the network access request comprises a Dynamic Host Configuration Protocol (DHCP) discover message or a Point-to-Point Protocol (PPP) configure request message.

4. The method of claim 1, further comprising authenticating the subscriber, wherein constructing the software interface stack comprises constructing the software interface stack based on the determination and the authentication.

5. The method of claim 4, wherein authenticating the subscriber comprises:
receiving an authentication credential from the subscriber device as part of the network access request; and
providing the authentication credential to an authentication service.

6. The method of claim 5, wherein providing the authentication credential to an authentication service comprises providing the authentication credential to a Remote Access Dial-In User Service (RADIUS) server.

7. The method of claim 1, wherein determining whether the subscriber device requires the label switching protocol interface comprises determining whether a subscriber profile associated with the subscriber specifies that the subscriber device requires the label switching protocol interface, wherein a network service provider that is different that the subscriber configures the subscriber profile for the subscriber.

8. The method of claim 7, further comprising storing the subscriber profile locally within the network access device that receives the network access request from the subscriber device.

9. The method of claim 7, further comprising retrieving the subscriber profile from a data store.

10. The method of claim 9, wherein retrieving the subscriber profile from a data store comprises retrieving the subscriber profile from a Remote Access Dial-In User Service (RADIUS) server.

11. The method of claim 1, wherein receiving the network access request from a subscriber device comprises receiving the network access request with a network card of the network access device, and wherein constructing a software interface stack comprises constructing the software interface stack within the network card of the network access device.

12. The method of claim 1, further comprising:
receiving a non-label switching protocol packet from the subscriber device; and
using the label switching protocol interface to create a label switching protocol packet that includes the non-label switching protocol packet.

13. The method of claim 1, further comprising:
receiving a label switching protocol packet destined for the subscriber device from a network;
using the label switching protocol interface to create a non-label switching protocol packet by removing a label switching protocol header of the label switching protocol packet; and
forwarding the non-label switching protocol packet to the subscriber device.

14. A non-transitory computer-readable medium comprising instructions for execution by a processor of a network access device, wherein the instructions cause the processor to:
receive a network access request from a subscriber device associated with a subscriber that does not have administrative access to the network access device;
determine, when the network access request is received, whether the subscriber device requires a label switching protocol interface for encapsulating and decapsulating traffic associated with the subscriber device according to the label switching protocol for communication with the label switching network; and
in response to receiving the network access request and upon determining that the subscriber device requires the label switching protocol interface, dynamically construct a software interface stack on the network access device that includes a plurality of interfaces based on the determination, each of the interfaces associated with a respective one of a plurality of protocols, wherein the plurality of interfaces includes the label switching protocol interface; and
subsequent to dynamically constructing the software interface stack on the network access device, process network communications from the subscriber device with the software interface stack of the network access device and route the network communications from the network access device to the label switching network.

15. The non-transitory computer-readable medium of claim 14, wherein the instructions that cause a processor to determine whether a label switching protocol interface is required comprise instructions that cause a processor to determine whether a subscriber profile associated with the subscriber specifies that the subscriber device requires the label switching protocol interface.

16. The non-transitory computer-readable medium of claim 14, further comprising instructions that cause a processor to retrieve the subscriber profile from a data store.

17. The non-transitory computer-readable medium of claim 16, wherein the instructions that cause a processor to retrieve the subscriber profile comprise instructions that cause a processor to retrieve the subscriber profile from a Remote Access Dial-In Service (RADIUS) server.

18. The non-transitory computer-readable medium of claim 14, further comprising instructions that cause a processor to:
receive a non-label switching protocol packet from the subscriber device; and
use the label switching protocol interface to create a label switching protocol packet that includes the non-label switching protocol packet.

19. The non-transitory computer-readable medium of claim 14, further comprising instructions that cause a processor to:

receive a label switching protocol packet destined for the subscriber device from a network;

use the label switching protocol interface to create a non-label switching protocol packet by removing a label switching protocol header of the label switching protocol packet; and forward the non-label switching protocol packet to the subscriber device.

20. A network access device comprising:
a network interface card that receives a network access request from the subscriber; and
a control unit that:
routes network packets from the subscriber to the label switching network;
determines, when the network access request is received, whether the subscriber requires a label switching protocol interface for encapsulating and decapsulating traffic associated with the subscriber according to the label switching protocol for communication with the label switching network; and
in response to receipt of the network access request and upon a determination that the subscriber requires the label switching protocol interface, controls dynamic construction of a software interface stack that includes a plurality of interfaces for the subscriber on the network interface card based on the determination, each of the interfaces associated with a respective one of a plurality of protocols, wherein the plurality of interfaces includes the label switching protocol interface,
wherein the network interface card processes network communications from the subscriber device with the software interface stack and routes the network communications to the label switching network.

21. The network access device of claim 20, wherein the label switching protocol is a Multi-Protocol Label Switching (MPLS) protocol.

22. The network access device of claim 20, wherein the network access request comprises a Dynamic Host Configuration Protocol (DHCP) discover message or a Point-to-Point Protocol (PPP) configure request message.

23. The network access device of claim 20, wherein the control unit authenticates the subscriber, and controls construction of the software interface stack based on the authentication.

24. The network access device of claim 20, wherein the control unit determines whether a subscriber profile associated with the subscriber specifies that the subscriber device requires the label switching protocol interface.

25. The network access device of claim 24, wherein the control unit retrieves the subscriber profile from a Remote Access Dial-In Service (RADIUS) server.

26. The network access device of claim 24, further comprising a subscriber profile cache that caches the subscriber profile locally.

27. The network access device of claim 20, wherein the network interface card comprises:
a forwarding component that receives the network access request from the subscriber device;
an interface controller that determines whether the interface stack exists on the network card; and
a dynamic configuration manager that constructs the interface stack on the network card as directed by the control unit.

28. The network access device of claim 20, wherein the network interface card receives a non-label switching protocol packet from the subscriber device, and uses the label switching protocol interface to create a label switching protocol packet that includes the non-label switching protocol packet.

29. The network access device of claim 20, wherein the network interface card receives a label switching protocol packet destined for the subscriber device from the network, uses the label switching protocol interface to create a non-label switching protocol packet by removing a label switching protocol header from the label switching protocol packet, and forwards the non-label switching protocol packet to the subscriber device.

30. The network access device of claim 20, wherein the network access device is a router.

31. A method comprising:
receiving, with a network card of a network access device, a network access request from a subscriber device;
sending an authentication request from the network access device to a remote authentication service in response to the network access request;
receiving a subscriber profile from the authentication service at the network access device in response to the request, the subscriber profile indicating that the subscriber device requires a label switching protocol interface for encapsulating and decapsulating traffic associated with the subscriber according to the label switching protocol for communication with a label switching network; and
constructing a software interface stack that includes a plurality of interfaces on the network access device for the subscriber on the network card according to the subscriber profile, each of the interfaces associated with a respective one of a plurality of protocols, wherein the plurality of interfaces includes the label switching protocol interface; and
processing network communications from the subscriber device with the software interface stack of the network access device and routing the network communications from the network access device to the label switching network.

32. The method of claim 1, wherein the plurality of interfaces comprises at least one of an Ethernet interface, a point-to-point protocol interface, or a virtual local area network interface, wherein constructing the software interface stack comprises constructing the software interface stack with the label switching protocol interface over the at least one of the Ethernet interface, the point-to-point protocol interface, or the virtual local area network interface.

33. The method of claim 12, wherein the non-label switching protocol packet is a layer 2 packet.

34. The method of claim 1, further comprising:
receiving a label switching protocol packet from the subscriber device; and
interpreting a label of the label switching protocol packet with the label switching protocol interface to determine how to forward the label switching protocol packet across the label switching network.

35. The method of claim 1, wherein the network access device is a broadband remote access server (BRAS).

36. The non-transitory computer-readable medium of claim 14, wherein the network access device is a broadband remote access server (BRAS).

37. The network access device of claim 20, wherein the network access device is a broadband remote access server (BRAS).

* * * * *

UNITED STATES PATENT AND TRADEMARK OFFICE
CERTIFICATE OF CORRECTION

| | | |
|---|---|---|
| PATENT NO. | : 7,978,602 B2 | |
| APPLICATION NO. | : 11/273010 | |
| DATED | : July 12, 2011 | |
| INVENTOR(S) | : Rijsman | |

It is certified that error appears in the above-identified patent and that said Letters Patent is hereby corrected as shown below:

Column 11, line 47 (claim 7): "different that the" should be -- different than the --

Signed and Sealed this
Twenty-fifth Day of September, 2012

David J. Kappos
*Director of the United States Patent and Trademark Office*